DEFLECTED BEAMS
INITIAL BEAM CROSS SECTION & RELATIVE POSITION OF QUADRUPOLE WIRES AT CENTRELINE.(+)   NEAR   FAR
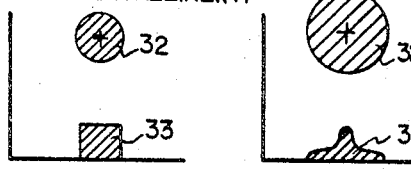   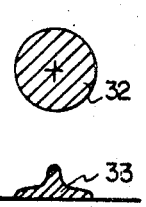   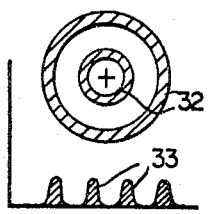
Fig. 7a   Fig. 7b   Fig. 7c.
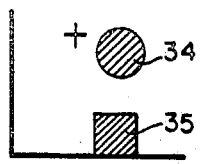   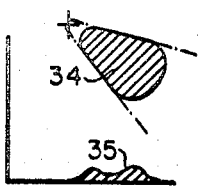   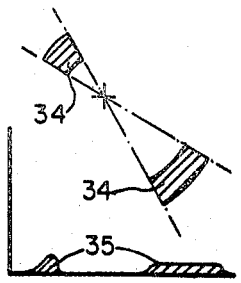
Fig. 8a   Fig. 8b.   Fig. 8c.
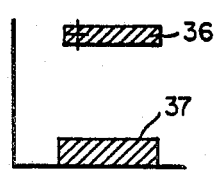   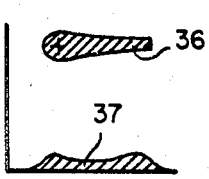   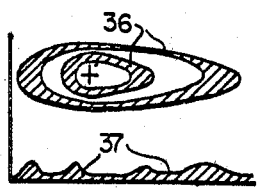
Fig. 9a   Fig. 9b.   Fig. 9c
INVENTORS
MYER BLOOM
ERIC ENGA
HIN LEW
BY J.A. Hughes
AGENT

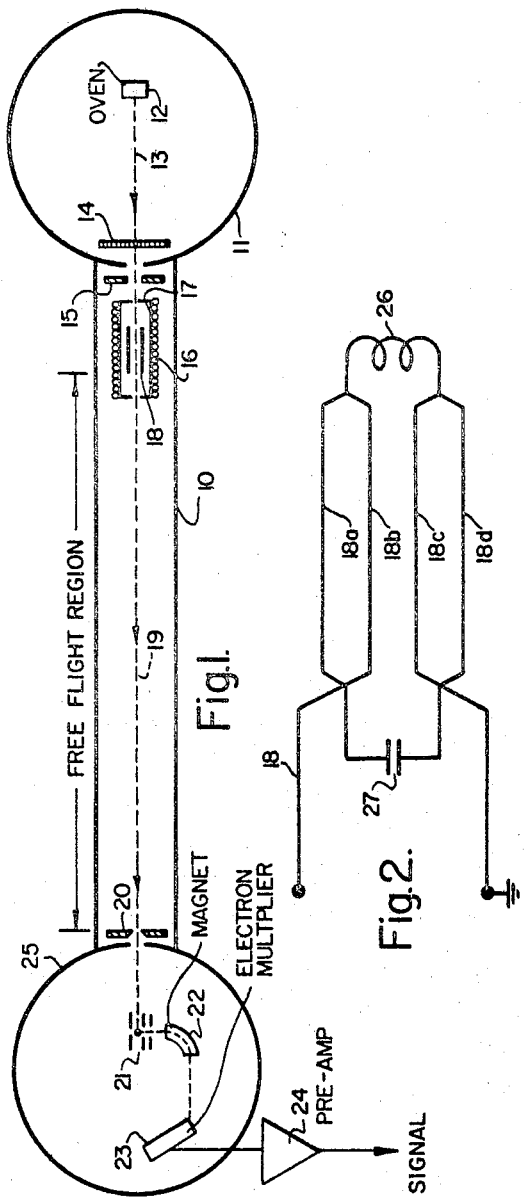

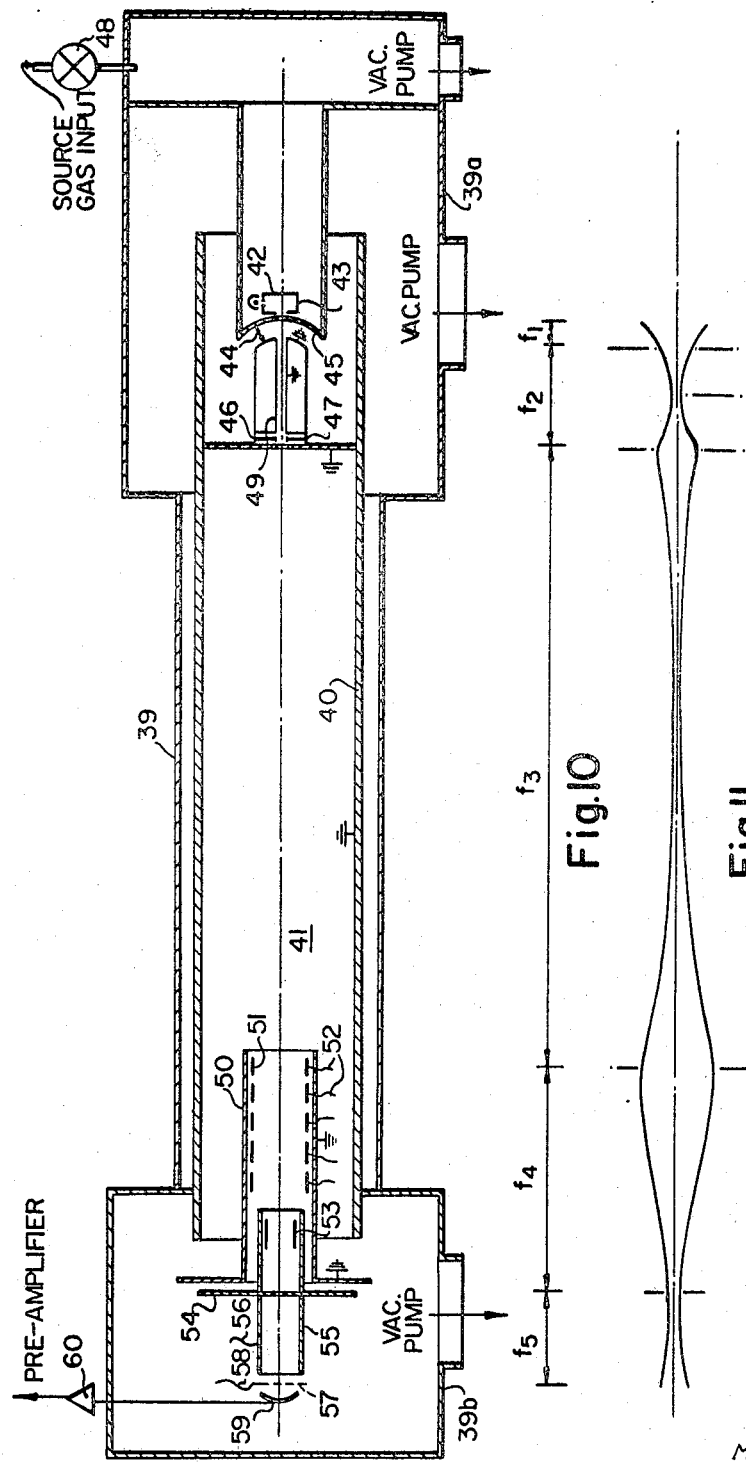

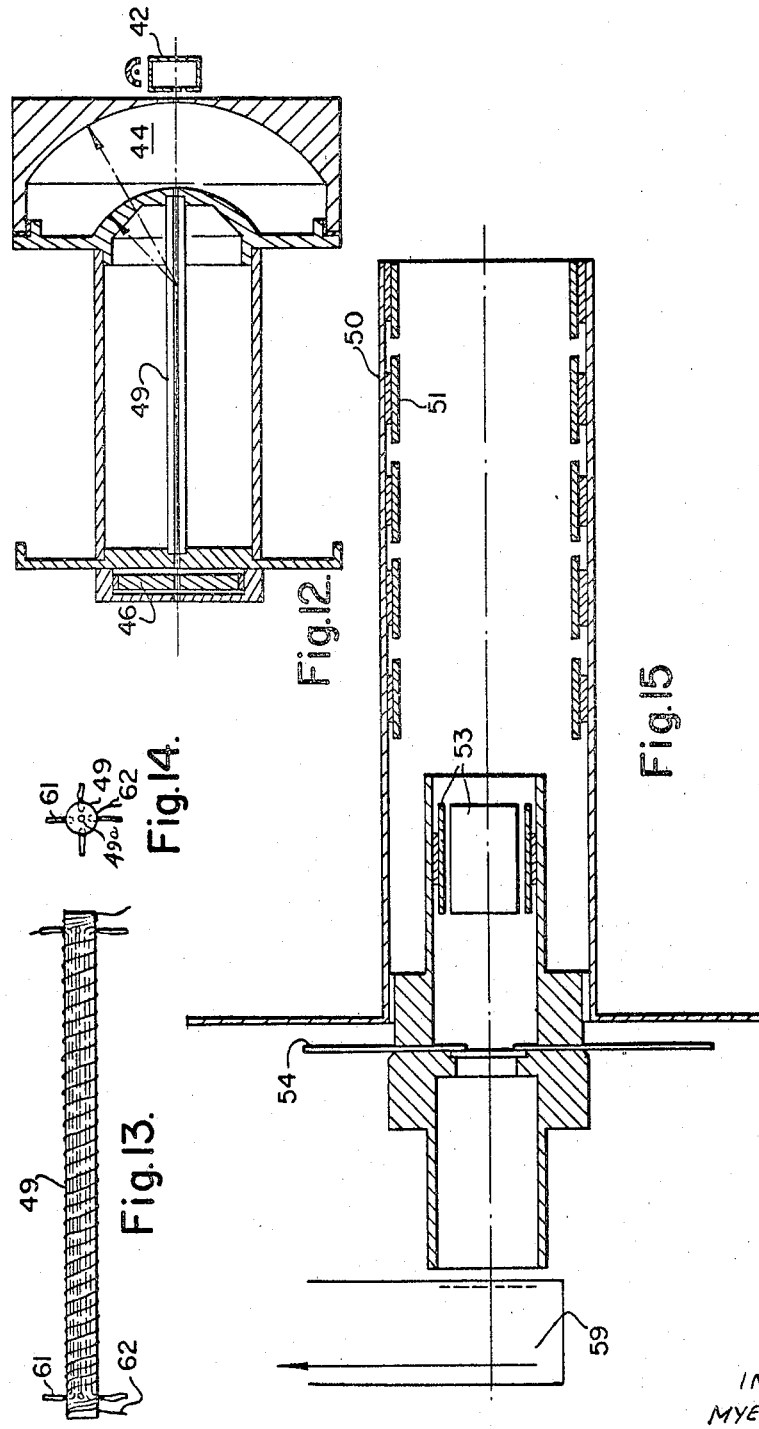

United States Patent Office 3,484,603
Patented Dec. 16, 1969

3,484,603
APPARATUS AND METHOD OF IDENTIFYING AND SELECTING PARTICLES HAVING A PREDETERMINED LEVEL OF ANGULAR MOMENTUM
Myer Bloom, Vancouver, Eric Enga, North Vancouver, and Hin Lew, Ottawa, Canada, assignors to Canadian Patents and Development Limited, Ottawa, Ontario, Canada, a corporation of Canada
Filed Apr. 29, 1968, Ser. No. 724,784
Int. Cl. B01d *59/44;* H01j *39/34*
U.S. Cl. 250—41.9
14 Claims

ABSTRACT OF THE DISCLOSURE

Apparatus and method for identifying and selecting charged or neutral particles wherein a beam of particles is passed through a region of magnetic field consisting of a time-independent, homogeneous magnetic field aligned generally parallel to the beam, on which has been superimposed a time-dependent (usually oscillatory) inhomogeneous magnetic field such that there will be a deflection of the particles in the beam due to the Stern-Gerlach force. The oscillating inhomogeneous field is set up by a 4-wire quadrupole system carrying alternating current whose frequency is chosen in relation to the Larmor frequency of the spin systems of the particles of interest.

---

Figure 5:
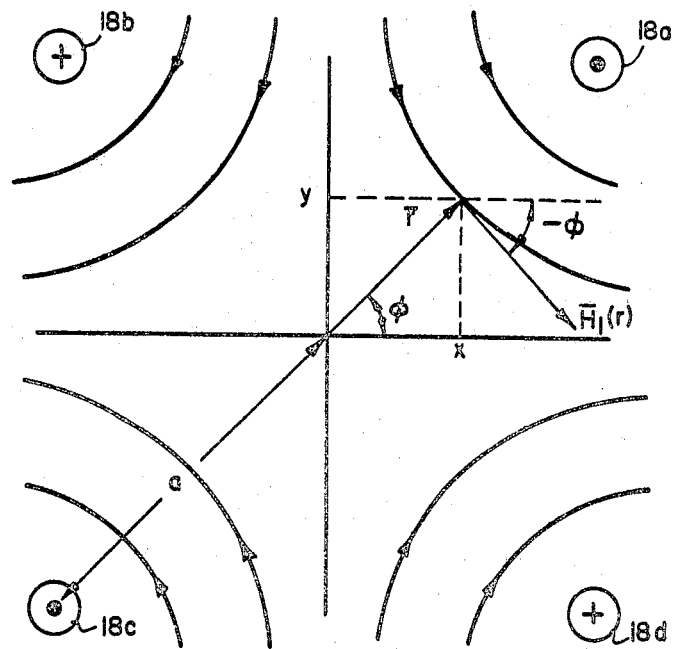

This invention relates to apparatus and method for identifying and selecting charged or neutral particles having a predeterminal level of angular momentum from a moving stream of charged or neutral particles respectively More particularly the invention is concerned with a method of obtaining space quantization i.e., correlation between position and angular momentum by means of a generalized Stern-Gerlach experiment.

The first Stern-Gerlach experiment was performed about 1920 and was the model for all such experiments up until the present. The first experiment consisted of a source of silver atoms, a collimating slit giving a well defined beam, a region of large magnetic field and magnetic field gradient (time-independent) through which the silver atom beam passed, and a detector consisting of a flat surface on which silver atoms are deposited and which could be visually observed if enough atoms were allowed to collect. This device served to separate the states of atomic silver which which had different magnetic moments. This occurred because in passing through the region of magnetic field gradient, each particle experienced a force proportional to the value of its magnetic moment, hence at the detector, those of largest magnetic moment were displaced furthest from the position it would have arrived at in the absence of a magnetic field gradient. By measuring the observed deflections, and knowing the magnetic field and field gradient one could deduce the various values of magnetic moment which the silver could possess. Since then, the Stern-Gerlach technique, along with two important modifications, the Rabi modification and the Ramsey modification both of which increase the precision of the measurement have been used to do precision measurements on a great range of atomic and molecular particles.

All Stern-Gerlach experimental techniques have two features in common. Because the measurements are made on non-interacting particles which form a beam, the procedure must be performed in a vacuum with the degree of vacuum required determined by the requirement that the beam be well preserved from source to detector. The second feature is that the magnetic moments of the particles experience a force known as the Stern-Gerlach force due to the appartaus. This enables one to measure the magnetic moments of a beam of particles that presumably start with a random distribution of moments or to select and prepare a beam that is in a polarized state, that is, with the magnetic moments of the particles pointing or oriented in a known direction.

It is difficult, due to various considerations to perform the conventional Stern-Gerlach technique on charged particles (ions). The chief reason is that the Lorentz force associated with a charged particle moving in a magnetic field is far larger than the Stern-Gerlach force. The spread of velocities inherent in any ionic beam would give rise to an uncertainty in that the Lorentz force would undoubtedly mask the effect of the Stern-Gerlach force.

It is an object of the present invention to provide a method and apparatus that will produce a beam of either charged or neutral particles having spatial separation of charged particles in different angular momentum (spin) states.

It is another object of the invention to provide a method of identifying and selecting charged or neutral particles having a predetermined orientation of spin or angular momentum from a beam of charged or neutral particles, respectively.

It is another object of the invention to produce a beam of charged or neutral particles which is polarized, that is, having a known direction of magnetic moment or spin for all or most of the particles in the beam.

These and other objects of the invention are achieved by passing a beam of charged or neutral particles through a region of magnetic field consisting of a time-independent, homogeneous magnetic field aligned parallel to the motion of the particles, on which is superimposed a time-independent (usually oscillatory) magnetic field. If the energy levels of the particles in the time-independent magnetic field are given by $E_1, E_2, \ldots$, etc., the difference between any two energy levels $i$ and $j$ can be used to define a frequency $f_{ij}$ in terms of the well known relation $hf_{ij} = E_i - E_j$, where $h$ is Planck's constant. When the time-dependent inhomogeneous field has a frequency component close to one of these values $f_{ij}$, space quantization occurs due to the Stern-Gerlach force resulting in a resonant displacement of the particles in a direction transverse to the homogeneous field. The characteristic resonant displacement so obtained is used to identify and select particles of a known angular momentum state.

Figure 6:
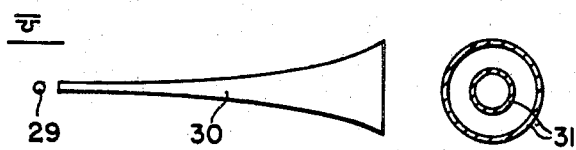

In drawings which illustrate embodiments of the invention,

FIGURE 1 is a cross-section of experimental apparatus for obtaining resonant deflection of neutral particles, FIGURE 2 is a schematic circuit diagram of the system for obtaining an oscillating inhomogeneous magnetic field, FIGURE 3 is a cross-section of the magnetic field producing arrangement of FIGURE 1, FIGURE 4 is an end view of the same arrangement, FIGURE 5 is an instantaneous field representation of the quadrupole system of FIGURES 3 and 4, FIGURE 6 is a representation of a beam of spin ½ particles and its resonant separation, FIGURES 7a, 7b, 7c, and 8a, 8b, 8c, and 9a, 9b, 9c show various separation distributions of a beam of particles of spin ½, FIGURE 10 is a cross-sectional view of an apparatus suitable for charged particles, FIGURE 11 shows a longitudinal cross-section of the beam related to its position in FIGURE 10, transverse scale greatly exaggerated, FIGURE 12 is a detailed cross-section of the charged particle source and deflecting region, suitable for charged particles, FIGURE 13 shows a preferred form of the deflecting quadrupole system for charged particles, FIGURE 14 is an end view of the arrangement of FIGURE 13, and FIGURE 15 is a cross-sectional view of a detecting assembly suitable for charged particles.

Referring to FIGURE 1, an experimental version of the apparatus for deflecting neutral particles is shown and consists of a cylindrical housing 10 defining a deflecting region, and a free flight region is connected at one end to an enlarged portion 11 which contains a source 12 of neutral particles. In an experimental set-up of the apparatus, the source was an oven containing potassium metal heated to 300° C. and having a hole of diameter 0.005 cm. to form the beam. The beam of particles 13 is directed to a collimator consisting of a toothed wheel chopper 14 and an aperture or hole in plate 15. The collimated beam enters the deflecting region which comprises a 4-wire quadrupole system 18 for producing an oscillating inhomogeneous magnetic field and a solenoid 16 wound on a cylindrical shield 17 for producing a steady homogeneous field in an axial direction parallel to the beam. After emerging from the deflecting region the beam 19 which is now diverging due to the Stern-Gerlach force passes through a fairly lengthy free flight region and strikes a detector plate 20 defining an aperture that would be variable both in size and position so that any selected portion of the beam relative to the center-line could be sampled and accepted by the detecting system contained in housing 25. The detecting system comprises a detector 21 which in an experimental set-up was a tungsten hot-wire ionizer and its associated mass-spectrometer 22. The output passes to pre-amplifier 24 and then to a commercial lock-in amplifier (not shown). Upper wheel 14 chops or modulates the beam at a rate of 30 c.p.s. and the pre-amplifier 24 is a narrow-band 30 c.p.s. amplifier. The unit described above is suitably evacuated to achieve the necessary vacuum level.

FIGURES 2, 3, and 4 show the 4-wire quadrupole system 18 in more detail. The four wires 18a, 18b, 18c, and 18d form part of a parallel resonant circuit along with capacitor 27 and coil 26 and are suitably energized from an exterior r.f. source whose frequency is predetermined. In the experimental set-up the source was a one kilowatt output commercial oscillator. The four wires are symmetrically positioned equidistant from a center-line position as shown in FIGURES 3 and 4.

FIGURE 5 gives a representation of the correlation of the oscillating inhomogeneous field set-up by the currents flowing in the quadrupole wires 18. The field $H_1(r) = G(x-iy) = Gr^*$ where the field gradient $$G = 0.8(1/a^2)$$

gauss/cm. and $I$ is the current in each wire in amperes and $a$ is the distance from the center of symmetry to the center of each wire in cm. The vector $r = x + iy$ denotes a vector in the plane perpendicular to the axis of the quadrupole wire system.

FIGURE 6 is a representation of the beam spread due to the Stern-Gerlach force in the quadrupole deflector region for a beam of particles of spin ½. A beam with circular cross-section 29 and velocity $\bar{v}$ and spin ½ spreads as shown at 30 and end cross-section 31. It will be noted that the beam is separated by the effect of the Stern-Gerlach force into reasonably well defined annular regions analogous to optical diffraction patterns. FIGURES 7, 8, and 9 show cross-sections of various initial beam cross-sections and differing positions from the center of symmetry (+) of the quadrupole system. In FIGURES 7a, 7b, and 7c, the beam cross-section is shown as 32 with the particle distribution spectra shown as 33. Similarly in FIGURES 8a, 8b, 8c, and also 9a, 9b, and 9c, the beams 34 and 36 and spectra 35 and 37 are shown.

The apparatus described above was generally experimental to show the feasibility and operation of the invention. FIGURE 10 illustrates a form of the device for charged particles as it is being put into practice. Housing or container 39 is evacuated by a series of vacuum pumps as shown and contains a cylindrical magnetic and electric shield 40 defining a central drift region 41. An enlarged portion 39a of the housing contains a conventional ionization assembly 42 energized via leads 43 which would be connected to an external power source (not shown). The source gas is introduced into the source vacuum chamber via valve 48 and after heating and ionization in ionizer 42 energized via leads 43 enters the collimating region which comprises a conventional Pierce type focussing assembly 44. The stream of ionized particles leaving the ionizer and the focussing region passes into the deflection region which comprises a four-conductor quadrupole system 49 which will be described in more detail below. The alternating inhomogeneous field set up in this region imparts a transverse Stern-Gerlach force to the particles which tend to diverge. The beam passes to an electrostatic ion lens which is energized via line 47 and which serves to focus the diverging beam. The beam passes through a relatively long drift tube region 41 before entering electrostatic ion lens and accelerating tube 50. A series of annular electrodes 51 carrying a stepped series of voltages supplied via leads 52 accelerates the beam through beam deflector plates 53, adjustable aperture plate 54, to the detector comprising focussing electrode 55, grid 57 with respective voltage leads 56 and 58 to electron multiplier 59. The output of the latter is amplified by amplifier 60 and is fed to suitable external measuring circuitry and indicators (not shown).

The beam cross-section is shown in FIGURE 11 and delineates the form of the beam at the focussing region $f_1$, the deflection region $f_2$ including the re-focussing, the drift region $f_3$, the accelerating and deflection region $f_4$, and the detection region $f_5$.

FIGURE 12 shows the deflection region in more detail and the relationship of the ionizer 42, the focussing system 44, the electrostatic focusser 46, and the deflection device 49. A preferred form of the latter is shown in FIGURES 13 and 14. A glass tube 49 has a central aperture 49a for the passage of the beam and the four quadrupole wires 61 are mounted in 4 grooves cut into the tube which serve to position the 4 conductors symmetrically about and equidistant from the central opening 49a. A solenoid coil 62 is wound around the glass tube to provide a time-independent homogeneous field.

Consideration is made for shielding the charged particle beam from all electric fields having components transverse to the motion of the beam. This applies to both time varying and time independent electric fields throughout most of the apparatus but particularly in the deflection unit. To this end a thin, electrically conducting tube, or alternately a faraday cage of suitable shape, is positioned in the central opening 49a, with provision made for electrically grounding it, or alternately for biasing it at any desired voltage, or alternately for passing an electric current longitudinally through it to produce a longitudinal electric field within it. Such shields must be designed to allow a large penetration of the time dependent inhomogeneous magnetic field and to allow only a negligible penetration of all transverse electric fields.

FIGURE 15 is a more detailed view of the detection region and the relation of the accelerating tube 50, the electrostatic ion lens 51, the beam deflection plates 53, the adjustable aperture 54 and the detector (electron multiplier) 59.

The apparatus shown in FIGURES 10 to 15 describe a preferred form of the invention suitable for charged particles but it should be pointed out that no claim is being made for the component parts of the apparatus excet the deflecting system. Most of the components are well-known devices e.g., the ionizer, the focussing devices, the accelerating tubes, and the electronmultiplier as such, and it is foreseen that various forms of the apparatus could be devised and still fall within the scope and spirit of the invention.

What is claimed is:

1. A method of producing a polarized beam of charged or neutral particles comprising initiating a collimated beam of charged or neutral particles, passing the beam through a region of time-independent homogeneous magnetic field generally parallel to the beam on which has been superimposed an alternating inhomogeneous magnetic field having a frequency of oscillation such as to modulate the beam due to the Stern-Gerlach force, and collecting the particles of interest so modulated.

2. A method of producing a polarized beam of charged or neutral particles as in claim 1 wherein the beam is deflected transversely of the beam centerline due to a transverse component of the Stern-Gerlach force.

3. A method of producing a polarized beam of charged or neutral particles as in claim 1 wherein the time-independent homogeneous magnetic field is produced by an electric winding in the form of a solenoid and the alternating inhomogeneous magnetic field is produced by a four-conductor quadrupole system energized at a frequency related to the Larmor frequency of the spin systems of the particles of interest.

4. A method of identifying particles of a specified magnetic moment state comprising passing a beam of particles through a magnetic region having a time-independent field component and an alternating inhomogeneous field component having a frequency of oscillation such as to deflect the beam due to the Stern-Gerlach force and collecting and measuring the particles having the specific magnetic moment state so deflected.

5. A method of identifying particles of a specific magnetic moment as in claim 4 wherein the time-independent field component is produced by an electric solenoid and the attending inhomogeneous field component is produced by a four-conductor quadrupole assembly energized at a frequency related to the Lamor frequency of the specified particles.

6. Apparatus for producing a beam of charged particles having a specific polarization comprising:
   (a) a source of charged particles,
   (b) collimating means for shaping the particles stream into a well-defined beam,
   (c) means for producing a magnetic field for polarizing said beam,
   (d) means for producing an alternating inhomogeneous magnetic field to modulate the beam due to the Stern-Gerlach force, and
   (e) means for collecting the particles having the stated polarization from the modulated beam.

7. Apparatus for producing a beam of charged particles as in claim 6 wherein the means for producing the alternating inhomogeneous magnetic field is a four-conductor quadrupole assembly.

8. Apparatus for producing a beam of neutral particles having a specific polarization comprising:
   (a) a source of neutral particles,
   (b) collimating means for shaping the particle stream into a well-defined beam,
   (c) means for producing a magnetic field for polarizing said beam,
   (d) means for producing an alternating inhomogeneous magnetic field to modulate the beam due to the Stern-Gerlach force, and
   (e) means for collecting the particles having the stated polarization from the modulated beam.

9. Apparatus for producing a beam of neutral particles as in claim 8 wherein the means for producing the alternating inhomogeneous magnetic field is a four-conductor quadrupole assembly.

10. Apparatus as in claim 6 wherein the means for producing the alternating, inhomogeneous magnetic field are four current carrying wires positioned symmetrically with and parallel to the beam center line, the frequency of said current being selected to produce a deflection or modulation of said beam.

11. Apparatus as in claim 6 wherein the means for producing the alternating, inhomogeneous magnetic field is a quadrupole assembly comprising a glass rod having a longitudinal central opening for passage of the beam and four conductors mounted longitudinally in the glass rod such that the conductors be at the corners of a square and are equidistant from the central longitudinal opening with provision for a thin-walled tube in the central opening.

12. Apparatus for identifying the state of the magnetic moment of a sample material comprising:
   (a) means for ionizing said sample,
   (b) means for collimating said ionized particles,
   (c) magnetic field means for polarizing said beam,
   (d) means for producing an oscillating, inhomogeneous magnetic field in the region of the beam, said field oscillating at a frequency selected to cause separation of the beam into discrete spatial regions containing particles having a magnetic moment related to said frequency, and
   (e) means for collecting and measuring the particles so separated.

13. Apparatus for identifying the state of the magnetic moment of a sample material as in claim 12 wherein the means for producing the oscillating, inhomogeneous magnetic field are conductor wires forming a multipole device with the wires positioned symmetrically about a centerline position and equidistant therefrom, said multipole device defining a deflection unit.

14. Apparatus as in claim 13 wherein the beam is passed through two or more deflection units.

References Cited

"Atomic and Nuclear Physics," by Derek Livesey, published by Blaisdell Publishing Company, 1966, pp. 409, 410.

RALPH G. NILSON, Primary Examiner

C. E. CHURCH, Assistant Examiner

U.S. Cl. X.R.

250—41.3